United States Patent [19]

Schäfer

[11] 3,748,422

[45] July 24, 1973

[54] INDUCTION COIL FOR INDUCTION HEATING OF MOVING ARTICLES

[75] Inventor: Hans Schäfer, Erlangen, Germany

[73] Assignee: Siemens Aktiengesellschaft, Munich, Germany

[22] Filed: Nov. 30, 1972

[21] Appl. No.: 310,875

[30] Foreign Application Priority Data
Dec. 3, 1971  Germany................... P 21 60 035.1

[52] U.S. Cl.......... 219/10.53, 219/10.43, 219/10.79
[51] Int. Cl. .............................................. H05b 5/06
[58] Field of Search...................... 219/10.79, 10.41, 219/10.43, 10.53, 10.57, 10.69, 10.73

[56] References Cited
UNITED STATES PATENTS

| | | | |
|---|---|---|---|
| 3,632,943 | 1/1972 | Engler............................... | 219/10.53 |
| 2,749,423 | 6/1956 | Bisterfeld..................... | 219/10.79 X |
| 2,426,053 | 8/1947 | Roberds........................... | 219/10.43 |
| 2,223,970 | 12/1940 | Stausel........................ | 219/10.79 X |

Primary Examiner—J. V. Truhe
Assistant Examiner—B. A. Reynolds
Attorney—Hugh A. Chapin and Richard L. Mayer

[57] ABSTRACT

An induction coil for induction heating and joining of moving articles and materials, particularly for heat sealing nonmetallic containers with closures containing metal foil and thermoplastic material.

The induction coil consists of two or more turns of an electrically conducting tube which can be cooled by a coolant flowing through it. The coil is provided at two opposite end sections with means for attenuating the alternating magnetic field in the vicinity of these sections, which is normally generated by the flow of alternating current. At each of the two end sections at least one turn of the coil is enclosed by a sleeve of metal of such wall thickness that the sleeve is substantially impervious to the alternating magnetic field of the enclosed turn, and each sleeve is connected with a single turn of the coil in an electrically and thermally conducting manner.

10 Claims, 5 Drawing Figures

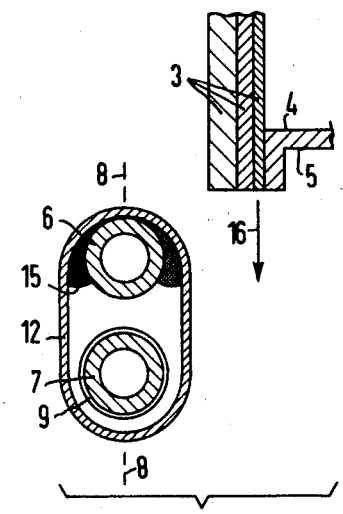
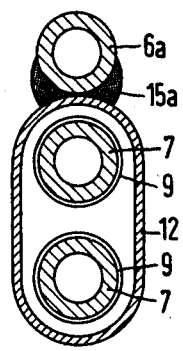
Fig. 2  Fig. 3
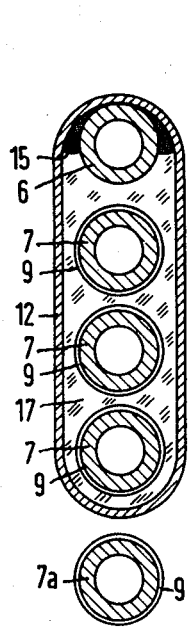
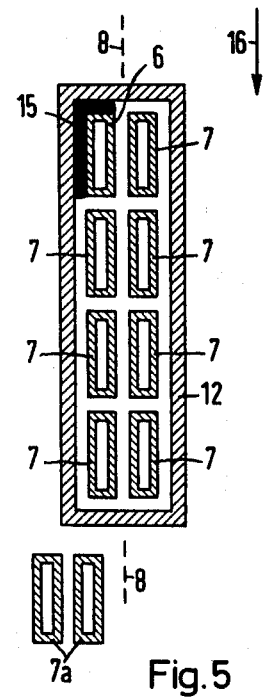
Fig. 4  Fig. 5

INDUCTION COIL FOR INDUCTION HEATING OF MOVING ARTICLES

BACKGROUND OF THE INVENTION

In German Pat. No. 1,297,520 a method is disclosed for sealing of containers of nonmetallic material with a metal foil, in which the metal foil is placed over the opening of the container with the interposition of a thermoplastic layer between the container and the foil, the foil then being pressed against the edge of the container and heated by a high-frequency electromagnetic induction field generated by an induction coil. For achieving a tight seal between the metal foil and the container, which can easily be stripped off, a thin metal foil coated with a thermoplastic layer, particularly with a thickness of thermoplastic between 0.025 and 0.05 mm, is used. A high-frequency electromagnetic induction field in the range of megahertz is employed, with a power of about 1.5 to 10 kW becoming effective to achieve a seal within a time of considerably less than a second.

For pressing on the foil and for the purpose of supplying heat, a mechanical type press of insulating material surrounding the induction coil and which can be raised and lowered relative to the containers is used in this process. In this known method the sealing of the containers is performed one by one individually, for instance, by means of a conveyer belt which moves stepwise.

Another prior method for sealing containers has further found acceptance, in which the containers, for instance, bottles, cans, cups, containers of glass, plastic and metal, are moved continuously through an alternating electromagnetic field generated by an induction coil by the passage of high-frequency alternating current, mainly parallel to the plane of the coil, with the foil placed on the edge of the opening to be sealed. This continuous method has the advantage that it makes possible a greater throughput of sealed containers in comparison with the above-mentioned method utilizing step-by-step sealing. The containers in the latter method are placed close together on a conveyer belt moving at a uniform speed and speeds of 45 meters per minute have already been achieved. This method is of considerable importance for the production and packaging of mass products, for instance, in production operations for food and other consumables, in the chemical, pharamaceutical and cosmetic industries, and therefore in all industries in which a granular, paste-like or liquid material, which is sensitive to moisture, oxygen or other gases, is protected by sealing against external influences for longer storage life.

Another method for interior coating of metal containers with a thermoplastic synthetic material, in which an induction coil is similarly used, is described in French Pat. No. 2,001,664.

In all of these prior methods, elongated induction coils have been used which consist of one or several turns of a metal tube. A coolant flowing through the metal tube, for instance, water, provides for sufficient cooling of the induction coil during operation.

In induction sealing of moving containers it has, however, been found that overheating and scorching occurs during the sealing operation, and specifically, at those points or portions of the foil and the container edge which first approach the magnetic effect region of the induction coil upon entering, as well as those which last leave the magnetic effect region after the container has moved through it. This overheating not only has a detrimental effect on the contents; depending on the material, it results at the points mentioned either in a poor, brittle bond between the foil and the container, and therefore in leaks caused thereby, or in excessive melting-together, which makes it difficult to strip off the foil when the container is opened.

This difficulty in making a joint which is equally good throughout occurs not only with induction sealing of moving containers by means of foil, but also whenever articles and material are moved essentially parallel to the plane of the induction coil through the latter's area of magnetic influence for induction heating and joining, and where during the movement a sealed joint is to be initiated in the area of the entrance and exit zone of the induction coil.

In an elongated, rectangular metal ribbon, on which a filament of thermoplastic material or tin has been placed for the purpose of frame-like coating at all four edges, and which is moved in its lengthwise direction at some distance from the plane of a current-carrying induction coil through the alternating magnetic field of the latter, considerably more heating is expected, for instance, at the two short sides of the ribbon than at the two long sides. The thermoplastic material or the tin, respectively, will therefore evaporate or burn off in the area of the narrow sides of the ribbon, while the heating at the two long sides of the metal ribbon leads to a sufficiently adherent edge layer.

BRIEF SUMMARY OF THE INVENTION

It is an object of the invention to design an induction coil sealing apparatus described above in such a manner that the shortcomings described in prior art techniques are largely avoided; i.e., that an article moving through the area of the magnetic effect of the coil is subjected to inductive heating which is substantially uniform on all sides and portions. The means which are used for attenuating the alternating magnetic field generated through the passage of ac current should not only be producible simply and inexpensively, but should also be resistant to mechanical and thermal influences.

The present invention is based on the consideration that the magnetic field strength has a pronounced maximum effect in the vicinity of the leading and trailing edge of the bodies being sealed; that at the moment of entering and leaving the magnetic field, only a small part of the body is exposed to the maximum edge field; that thereby a ring current of high intensity flowing at the edge of the field is induced in those parts of the body and a large thermal power density is produced; and that therefore the energy transfer must be reduced at the entrance and the exit zone of the induction coil, in order to achieve so-called soft coupling.

In the above-mentioned French Pat. No. 2,001,664 an elongated induction coil is shown, which is bent upwardly at the two sections which correspond to the entrance and exit zone of the moving containers in such a manner that the distance of the raised sections from the plane of travel of the containers is greater than that of the outer sections of the coil. By this provision a reduction of the magnetic field strength in the vicinity of the two zones is achieved. The two raised, oppositely situated, coil sections can therefore be considered as means for attenuating the alternating magnetic field in the vicinity of these sections. For some purposes, particularly if the induction coil is cast into an encapsulant for preserving its shape, however, an awkward shape of the coil may result. Furthermore, the raised coil section can easily break at the bends.

According to the invention, the stated problem is solved by providing at each of the two end sections for at least one turn of the coil to be enclosed by a sleeve of such wall thickness that the sleeve is substantially impervious to the alternating magnetic field of the enclosed turn, and that each sleeve is connected with a single turn of the coil in an electrically and thermally conducting manner.

Each such sleeve may be connected in an electrically and thermally conducting manner with one of the turns arranged on the outside. However, it may also be arranged so that at least two turns of the coil are enclosed by the sleeve and that the sleeve is connected in an electrically and thermally conducting manner with one of the turns located in the interior of the coil assembly.

In both arrangements the sleeve assumes, in addition to a function as a protective enclosure, the function of a magnetic shield against the outside for the current-carrying turns located inside it. The turns in the interior of the sleeve cause an alternating magnetic flux which flows essentially on the inside surface of the sleeve and hardly penetrates to the outside. Only the turn connected with the sleeve in an electrically conducting manner, for instance, by soldering, contributes to the alternating magnetic field at the entrance or exit zone of the induction coil, besides the further turns located outside the sleeve, which may be present. However, this magnetically effective contribution of the turn in question is determined not by the total current, but only by a fraction of the current flowing through the turn in question and via the sleeve, as this current flows essentially along the inside wall of the sleeve.

If the alternating magnetic field is to be reduced further at the entrance and the exit zone, at least one of the turns located outside the sleeve can be displaced in the vicinity of the sleeve vertically above the main plane of the coil, in such a manner that it is bent away from the moving body. Through bending by hand, a certain adjustment of the magnetic field at the entrance and exit zones is possible.

As already discussed, each of the sleeves used consists of metal. Copper, brass and aluminum are suitable metals as they have high conductivity. Although ferromagnetic materials, for instance, steel, nickel and iron, also shield the alternating magnetic field generated in the interior of the sleeve against the outside, they have a relatively high ohmic resistance, so that the sleeve is heated up if such materials are used. If the sleeve is heated up too much, the normally present insulation of the coil turns may melt. The metal used must therefore be of low resistivity, so that excessive heating of the sleeve is prevented.

Even if the relatively low-resistance metals mentioned as sleeve material are used, heating of the sleeves by induced currents cannot be avoided. The highly conductive thermal connection between said turn, which is cooled by the coolant flowing through it, and the sleeve provides at the same time for the removal of the heat produced by induction. The sleeve is therefore cooled by the coolant of said turn, which is con-sidered as a particular advantage. Separate cooling of the sleeve is therefore unnecessary.

Further embodiments and advantages of the invention will be seen from the following description of examples of embodiments and from the patent claims.

DESCRIPTION OF THE DRAWINGS

The invention will be explained in the following more fully with the aid of examples of embodiments. For the same or similar parts the same reference symbols are used here. In the drawings:

FIG. 2 is an enlarged partial section taken along line II—II shown in FIG. 1;

FIG. 3 is a view similar to FIG. 2 showing an induction coil consisting of three turns;

FIG. 4 is a view similar to FIG. 2 showing an induction coil consisting of five turns; and FIG. 5 is a view similar to FIG. 2 showing a rectangular end sleeve and an induction coil consisting of ten turns.

DESCRIPTION OF THE PREFERRED EMBODIMENTS

Figure 1:
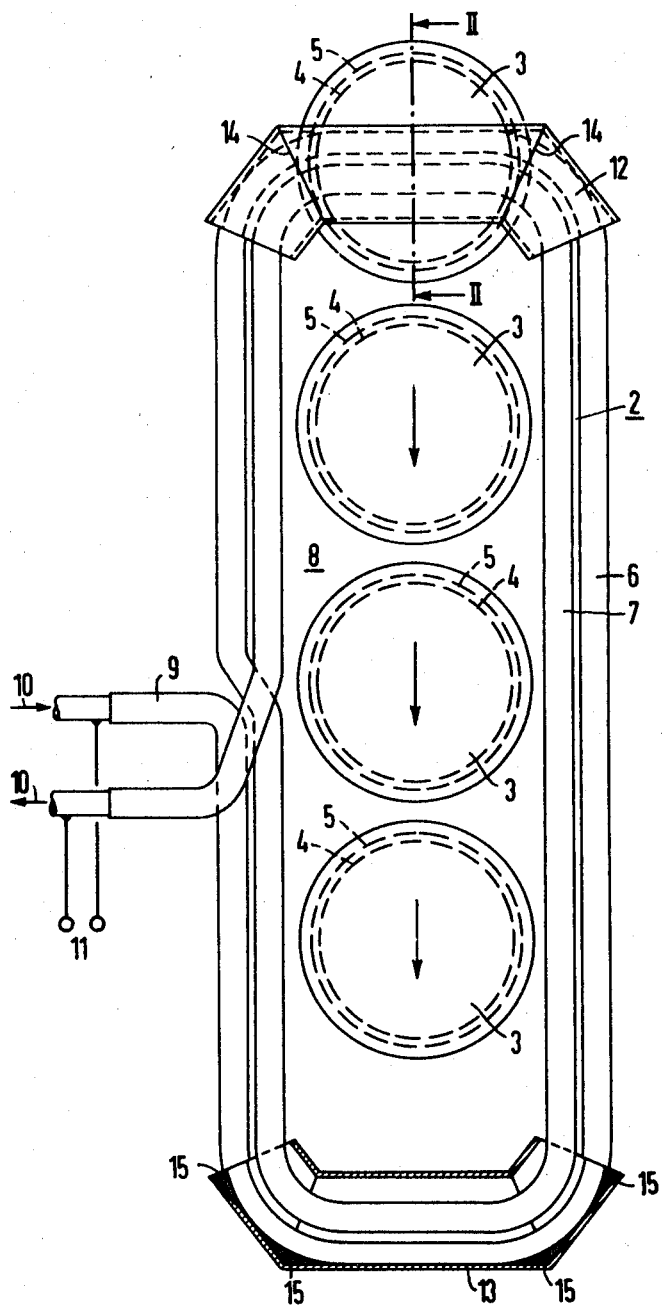
FIG. 1 is a schematic plan view of an induction coil consisting of two turns with two end sleeves.

In FIG. 1 a stationary induction coil 2 for sealing containers with covers 3 is shown. The containers, for instance, cups of plastic, are provided with a widened-out edge which is flush with the edge of the cover 3 placed on it. The inside wall 4 of each container, not visible in top view, is drawn in broken lines, as is the outside wall 5. The upper part of each cover 3 consists, for instance, of cardboard, the middle of aluminum and the lower part, which rests on the edge of the container, of a thin thermoplastic layer. The containers are moved in a straight line at uniform speed in the direction of the arrows shown under the induction coil 2, with the cover 3 in place. The plane of travel is therefore situated at some distance below the plane of the coil.

The induction coil 2 is bent of an electrically highly conductive metal tube, for instance, of copper tubing. It consists of two turns 6 and 7, which are arranged essentially in the same plane 8 side by side. The two turns may also be arranged one on top of the other. The plane of the coil 8 is made elongated in the direction of travel of the containers, and in top view the induction coil 2 is of approximately rectangular shape as shown. For a given amount of high-frequency power, the shape and dimensions of the coil depend mainly on the shape, dimensions and speed of travel of the covers 3 and containers which are to be induction heated. If the containers with the covers 3 placed on them are, for instance, passed underneath the induction coil 2 on a turntable (not shown), the plane of the coil 8 will advantageously be given kidney or arcuate shape. Tests have shown that the inner transverse width of the induction coil 2 should be somewhat larger for optimum energy transfer than the diameter of the covers 3.

The turns 6 and 7 can be covered on the outside with an insulation layer 9. For cooling, the induction coil 2 is supplied with a cooling medium 10, for instance, water. The input and output ends of the coil are equipped with electrical terminals 11, to which a high-frequency generator, not shown, is connected for the purpose of feeding in alternating current. The induction sealing of the containers is therefore performed in a continuous operation.

To avoid overheating at the containers and covers 3 upon entering or leaving the area of magnetic effect of the induction coil 2, the latter is provided with means which attenuate the alternating magnetic field at the entrance zone and the exit zone. These means consist of two tubular sleeves 12 and 13, which enclose the two turns 6 and 7 at the two opposite end sections of the induction coil 2. The sleeve 13 is shown in FIG. 1 in a cross section laid through the coil plane 8. Both sleeves 12 and 13 consist of copper, i.e., an electrically and thermally highly conductive metal. They cover the bends of the induction coil 2 at the ends completely. Each of the sleeves 12 and 13 consists of three parts, which are connected with each other in an electrically conducting manner at welding or soldering seams 14.

In FIG. 2 the sleeve 12 shown at the entrance section in FIG. 1 is shown in the cross section II—II. The other sleeve 13 is of similar construction. As will be seen from FIG. 2, the sleeve 12 is made as a unitary tubular enclosure of approximately oval cross section. It may also consist of two shell-like halves which are detachably connected with each other. It has already been stated that both turns 6 and 7 are arranged inside the sleeve 12. The turn 7 is brought out free, while the turn 6 is connected with the sleeve 12 at a solder joint 15 in an electrically and thermally conducting manner. The turn 6 can, of course, also be connected with the sleeve 12 by screw connections or by welding. Otherwise, the induction coil 2 can also be cast together with the sleeves 12 and 13 into a frame or into a plate of plastic, to preserve its shape and for protection against mechanical damage.

To the right of the sleeve 12, the leading upper portion of a container with a three-piece cover 3 placed on it is shown, which is moved into the central magnetic field of the induction coil 2 at some distance from the sleeve 12 in the direction of the arrow 16 and parallel to the plane of the coil 8.

In the absence of the sleeve 12, the effective field strength of the alternating magnetic field, to which the containers and covers 3 are exposed in the entrance zone of the induction coil 2, is proportional to twice the magnitude of the current which flows through one of the turns 6 and 7. After the sleeve 12 is inserted, only a fraction of this amount contributes to the effective field strength, as in the entrance section the current of the turn 7 is magnetically shielded by the sleeve 12, and as the current of the turn 6 essentially flows there through the inside wall of the sleeve 12. A similar situation applies for the sleeve 13. In the area of the inner long sides of the induction coil 2, however, twice the amount of the current is effective. The thermal coupling of the sleeve 12 to the turn 6 via the solder joint 15 assures removal of the heat generated in the sleeve 12 by induced currents.

In FIG. 3 a cross section through a sleeve 12 and through an induction coil consisting of three turns is shown. This cross section corresponds again to a cross section along the section line II—II in FIG. 1. Turns 6 or 7 arranged outside the sleeve 12 are designated here and in the following with the letter a added to the reference symbol.

In the arrangement shown in FIG. 3, two turns 7 are brought through the sleeve without making contact. The third turn 6a is arranged outside and is connected with the sleeve 12 via a solder joint 15a. The solder joint 15a again provides for a good electrical and thermal contact between the sleeve 12 and the outer turn 6a. Therefore it is assured here also that the heat loss in the sleeve 12 is removed via the coolant in the turn 6a. Further, a considerable share of the current fed in by the turn 6a flows here, too, via the inner wall of the sleeve 12, which shields the magnetic field caused by the two turns 7 situated in its interior against the outside. An arrangement according to FIG. 3 therefore produces in the entrance zone essentially an alternating magnetic field of the same magnitude as the arrangement according to FIG. 2. However, it has the advantage that the magnetic field strength at the entrance zone is considerably more reduced relative to the field strength in the region of the inner long sides of the induction coil than in an arrangement according to FIG. 2.

In FIG. 4 the cross section of a sleeve 12 and an induction coil consisting of five turns is shown according to the section line II—II of FIG. 1. The inner turn 6 is connected with the sleeve 12 via a solder joint 15, while the three turns 7 are brought through the sleeve 12 without making electrical contact. The free inner space of the sleeve 12 is filled with an electrical insulating material 17, for instance, a plastic material which gives support to the turns 7. Outside of the sleeve 12, the fifth turn 7a is arranged free. The alternating magnetic field at the entrance zone is determined as to magnitude in this arrangement by the current flowing from the turn 6 via the sleeve 12 and the current flowing via the outer turn 7a.

In the FIGS. 2 to 4 described above, turns of round cross section were shown. Another cross sectional shape can, of course, also be chosen; the cross section of the sleeves is then advantageously matched to the former. In FIG. 5 a sleeve 12 of rectangular cross section arranged at the entrance zone is shown. The induction coil with a total of ten turns itself is wound of rectangular tubing. The sleeve 12 encloses eight turns 6 and 7, of which the turn 6 is again soldered to the inner space of the sleeve 12 via a solder joint 15. The two adjacent turns 7a run outside the sleeve 12. They are arranged in a displaced position above the main plane of the coil 8 in the region of the sleeve 12. The displacement was made so that the coupling distance from the moving containers and covers was increased. Its contribution to the effective magnetic field strength at the sealing points is therefore smaller than if they were arranged in the plane of the coil. The coupling distance can be adjusted by hand through bending. Only the high-frequency current in the turns 6 and 7a contributes to the effective field strength.

In conclusion, it should be emphasized that the described and illustrated induction coils with attenuation of the alternating magnetic field at two opposite end sections can be used not only for the sealing of containers. They can be used whereever articles or materials brought into an alternating magnetic field are to be heated by induction uniformly on all sides.

What is claimed is:

1. An induction coil assembly for induction heating and joining moving articles and materials, particularly for the induction sealing of moving containers with a foil, comprising a plurality of turns of an electrically conducting tubing adapted to be cooled by a coolant that flows through it, said assembly being provided at its two opposite end sections with means for attenuating the alternating magnetic field in the vicinity of said sections which is generated by the passage of ac current therethrough, said means each including a metallic sleeve member enclosing at least one turn of said tubing at the respective end section and being of such wall thickness that the sleeve is substantially impervious to the alternating magnetic field of the enclosed turn.

2. In an induction coil assembly according to claim 1, each said sleeve being connected to one of said turns at the respective end section in an electrically and thermally conducting manner.

3. In an induction coil assembly according to claim 1, at least one turn of said tubing being enclosed by its respective sleeve, and at least another one of the turns being disposed on the outside of said sleeve and connected thereto in an electrically and thermally conducting manner.

4. In an induction coil assembly according to claim 1, at least two turns of said tubing being enclosed by its respective sleeve and said sleeve being connected with one of said enclosed turns in an electrically and thermally conducting manner.

5. In an induction coil assembly according to claim 1, at least one of said turns is disposed externally of its respective sleeve and is displaced vertically relative to the main plane of the coil in the vicinity of said sleeve.

6. In an induction coil assembly according to claim 1, each said sleeve being composed of a material selected from the group consisting of copper, brass or aluminum.

7. In an induction coil assembly according to claim 1, each said sleeve being a tubular enclosure of oval cross section.

8. In an induction coil assembly according to claim 1, the free interior space of each said sleeve being filled with insulating material.

9. In an induction coil assembly according to claim 1, said assembly being cast together with said sleeves into a frame of plastic material.

10. In an induction coil assembly according to claim 1, said assembly being cast together with said sleeves into a plate of plastic material.

* * * * *